Patented Nov. 28, 1922.

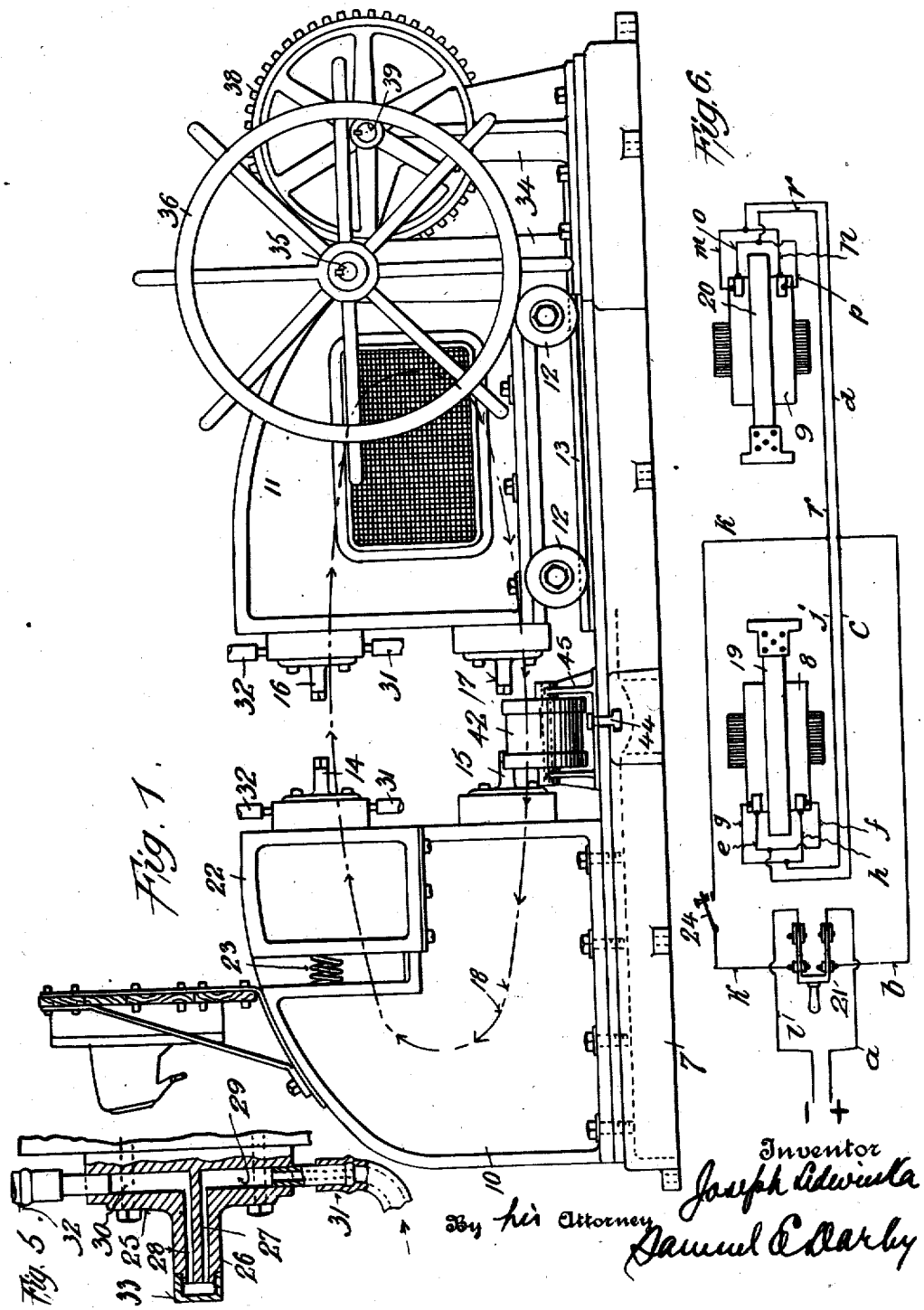

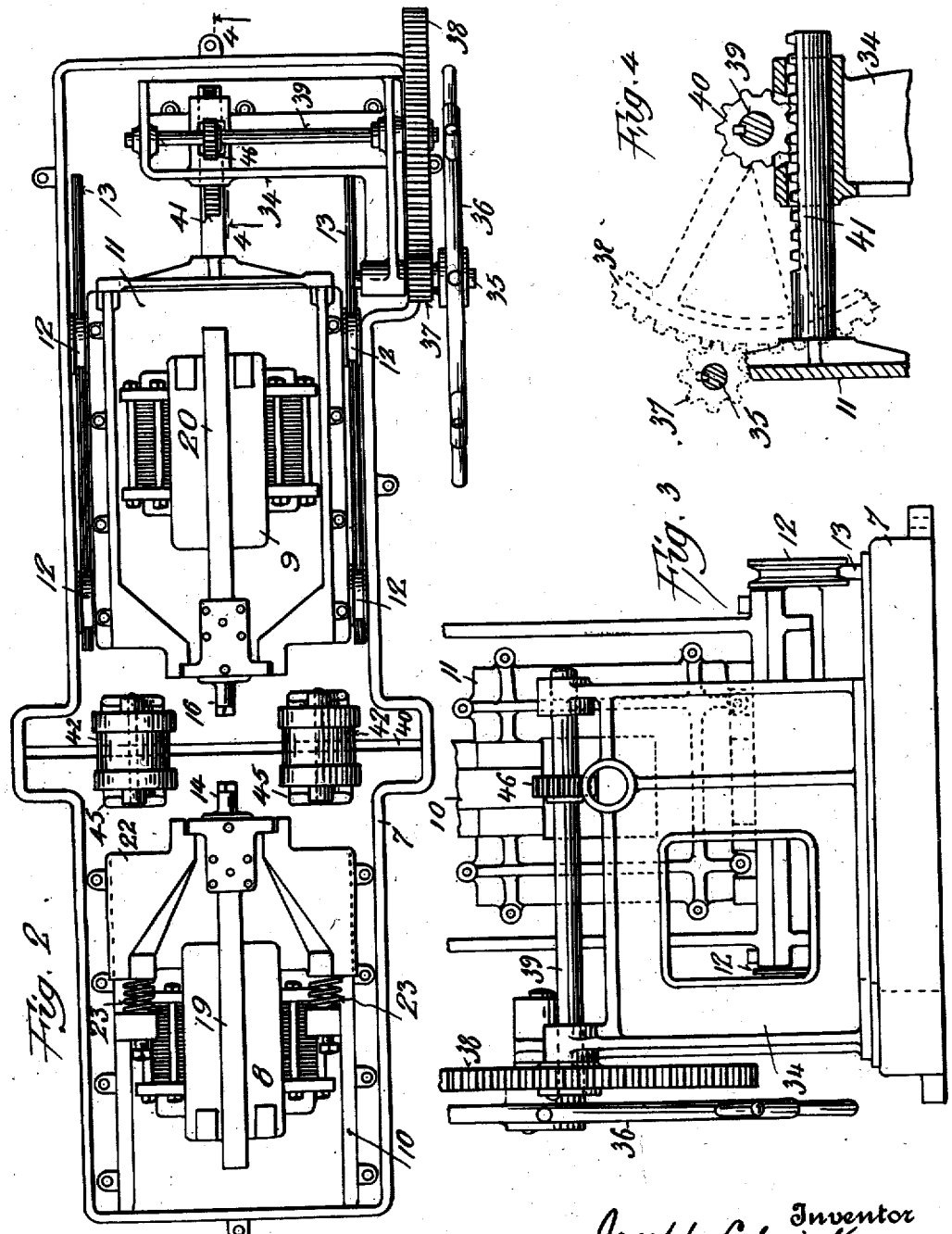

1,436,716

UNITED STATES PATENT OFFICE.

JOSEPH LEDWINKA, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

DUPLEX ELECTRIC-WELDING MACHINE.

Application filed April 17, 1919. Serial No. 290,784.

*To all whom it may concern:*

Be it known that I, JOSEPH LEDWINKA, a citizen of the United States, residing at Philadelphia, in the county of Philadelphia, State of Pennsylvania, have made a certain new and useful Invention in Duplex Electric-Welding Machines, of which the following is a specification.

This invention relates to duplex electric welding machines.

The object of the invention is to provide an electric welding machine for simultaneously forming a plurality of electric welds, and which is simple in structure and easy to manipulate and operate.

A further object of the invention is to provide an arrangement in a duplex electric welding machine of welding contacts or electrodes arranged in cooperating pairs, all of the pairs of contacts or electrodes being disposed when in operation in series in the circuit carrying the welding current.

A further object of the invention is to provide means for securing even pressure of the members of all the pairs of contacts or electrodes in simultaneous service application.

A further object of the invention is to provide means which are simple and efficient for bodily adjusting one member of each pair of electrodes simultaneously towards the cooperating members of the pairs of electrodes for service application.

A further object of the invention is to provide a simple and efficient support for the work while in position to be acted upon by the contacts or electrodes and which facilitates the manipulation of the work in presenting various points thereof to the action of the welding electrodes.

A further object of the invention is to provide means which are simple and efficient for maintaining the welding contacts or electrodes cool.

Other objects of the invention will appear more fully hereinafter.

The invention consists substantially in the construction, combination, location and relative arrangement of parts, all as will be more fully hereinafter set forth, as shown in the accompanying drawings and finally pointed out in the appended claims.

Referring to the accompanying drawings:—

Fig. 1, is a view in side elevation of a duplex electric welding machine constructed in accordance with and embodying the principles of my invention.

Fig. 2 is a top plan view of the same.

Fig. 3 is a view in end elevation looking towards the right hand end of the machine as shown in Figs. 1 and 2.

Fig. 4 is a broken detail view in section on the line 4, 4, Fig. 2, looking in the direction of the arrows.

Fig. 5 is a broken detail view in section longitudinally through one of the welding contacts or points.

Fig. 6 is a view in diagram showing the circuits of the primary windings of the transformers.

The same part is designated by the same reference numeral wherever it occurs throughout the several views.

In the drawing reference numeral 7 designates the foundation plate or support upon which the various parts are carried. 8 and 9 designate respectively two transformers, one of which, as for example, 8, being mounted upon a standard 10 suitably bolted or otherwise secured to the base plate 7. The transformer 9 is carried in a frame 11 which is mounted for movement towards and from the standard or frame 10. To facilitate the movement of frame 11 said frame is supplied with rollers 12 which operate along track rails 13 disposed longitudinally of and upon the base plate or support 7. Each frame 10, 11, carries a plurality of welding points or contacts 14, 15, 16, 17. The contacts or points 14, 15, are carried by frame 10 while the contacts or points 16, 17, are carried by the frame 11. The various contacts or points are so relatively disposed and arranged as to constitute pairs, the contacts or points 14, 16, constituting one pair, and the points 15, 17, constituting another pair. The work to be welded is disposed in the space between the two frames 10, 11 so that the pairs of welding contacts or points, the members of each of which are disposed in line with each other, are brought into contact with the work on opposite sides thereof. The contacts or points 14, 15, are associated with transformer 8 while the contacts 16, 17, are associated with the transformer 9, or rather the contacts 14, 15, are associated in or form part of the secondary circuit of the transformer 8, while the contacts 16, 17 are associated in or constitute a part of the secondary circuit of the transformer 9, and in such relation to each other that while in working position the secondary windings of the two transformers and the pairs of contacts or points are all in series with each other, the direction of flow of current being indicated by the dotted line 18, see Fig. 1. In the arrangement shown, to which, however, my invention is not to be limited or restricted, a conductor member 19, 20, is straddled over the primary windings and core of each of the transformers 8, 9, and constitutes the secondaries of said respective transformers, the contacts or points 14, 15, being in electrical connection with the terminals of the strap 19 while the contacts of terminals 16, 17 are in electrical connection with the terminals of the strap 20. When the two members of the various pairs of contacts are brought into working position or relation with reference to the material to be welded, then the circuit of the secondaries of the two transformers becomes closed, said circuit including the secondaries of both transformers and being completed through the contact points and the work interposed between them. This is the relation of the parts during a welding operation, the welding being accomplished between each cooperating pair of points or contacts. By suitably connecting the primary windings of the two transformers to the current source current in the secondary circuits of the transformers which includes the pairs 14, 16 and 15, 17 of welding contacts or points in series therewith will flow in the direction indicated as above stated by the dotted line 18 when the machine is in operation and current is supplied to the primaries of the transformers.

In Fig. 6 I have shown a circuit diagram illustrating one method of control of the current supply to the primaries of the transformers. Current from the mains is controlled initially by a switch device indicated generally at 21, which, when closed, supplies current from the current source through wire $a$, switch 21, wire $b$, thence the current divides through wires $c$, $d$, the wire $o$ supplying current through wires $e$ and $f$ to the various windings of the primary of the transformer 8, and thence through wires $g$, $h$, $j$, $k$, switch 21, wire $l$, to the negative side of the current source. The other portion of the current supplied through wire $b$ flows through wire $d$ and wires $m$ and $n$ through the various primary windings of the transformer 9, and thence to return through wires $o$, $p$, $r$, $k$, switch 21 of the wire $l$ to the negative side of the current source.

In the practical operation of welding machines it frequently happens that one or the other members of a cooperating pair of contacts may be burned off, or in the case of a duplex machine in which a plurality of pairs of welding points or contacts are to be simultaneously operated it sometimes occurs that the same thickness of material is not presented between the members of the various pairs of points with the result that when the points are brought into working position they fail to bear with equal pressures upon the material. This is objectionable resulting in destructive arcing and a failure to accomplish an effective welding joint. To overcome this objection I have provided a balancing arrangement, the function of which is to cause the same contacting pressure of all of the contacts or welding points. The desired result is accomplished in one simple and effective arrangement by mounting one or more of the contact points for yielding movement while the others are maintained stationary and rigid. Where a duplex welding arrangement is employed containing only two pairs of welding contacts or points it is sufficient for practical purposes to provide a balancing arrangement for only one of the four contacts or welding points. In the case of the yielding mounting of a contact or welding point I prefer to extend said contact or point to a greater distance towards its cooperating contact or point than that to which the other contacts or points are extended, and to mount the same upon a carrier 22, see Figs. 1 and 2, which is normally pressed forwardly or towards the space between the two frames 10, 11 by means of suitable springs 23. This arrangement permits the contact or point 14, or its carrier, to yield and to be retracted or withdrawn as the frame 11 is advanced towards working position until the various contacts or points of the system attain substantially the same degree of pressure on the work.

In practice a suitable switch device is arranged in one of the circuit connections of the transformer primary circuit and in Fig. 6 I have illustrated such a switch device at 24 disposed in the return wire connection $l$. It is immaterial, of course, in what part of the circuit this switch may be located. In the operation of the apparatus this switch is not closed until the contacts have been brought into welding or working relation with respect to the work disposed between the members of the various pairs of contacts or points.

In order to maintain the welding contact or points properly cooled I provide in accordance with my invention a very simple arrangement for securing the circulation of a cooling medium such as water through the electrodes or welding points. An arrangement embodying my invention in this respect is shown in Fig. 5. Each contact consists of a body portion 25 and a projecting point portion 26 both formed in one piece and of suitable material. Longitudinally through the point portion 26 I drill passages 27, 28, from the outer end surfaces thereof and which channels extend into the body portion 25. I likewise drill radial passages 29, 30, through the body portion 25 from the periphery thereof to join respectively with the axial or longitudinal channels 27, 28. By suitably connecting a water supply pipe 31 for delivering water into the bore 29 a circulation of cooling medium through the welding point and the body thereof is accomplished from the supply pipe 31, bore 29, channel 27, channel 28, bore 30, and return pipe connection 32. To close the outer ends of the channels 27, 28, I provide the projection or point portion 26 with a cap 33 and this cap or the outer face thereof constitutes the contact portion which engages the work in accomplishing the weld.

This cooling arrangement is exceedingly simple and can be accomplished very quickly and easily.

In order to move the frame 11 carrying the transformer 9 and its associated welding points 16, 17, bodily towards and from the frame 10 carrying the transformer 8 and the points 14, 15, I provide the base 7 with standards 34, in which is journaled a short shaft 35 upon which is mounted a suitable operating member, such for example, as a hand wheel 36. Upon shaft 35 is mounted a pinion 37 which meshes with and drives a gear 38 carried by a shaft 39 which is journaled in standard 34 and upon which shaft is carried a pinion 40 which meshes with a rack bar 41 connected to the frame 11. By this arrangement by suitably manipulating the operating member 36 the frame 11 may be shifted along track rails 13 to advance the contact points 16, 17, to their working positions or to withdraw them from working position.

In the handling of various kinds of work to be welded, particularly where a number of welds are to be formed on the same piece of work, it is desirable to provide means for supporting the work in such manner as to permit the same to be easily shifted from one position to another to receive the successive welds, as for example, when welding up wheels, pulleys, or the like. To accomplish this result I mount suitable supporting rollers 42 upon the bed plate 7, and in the space between the frame 10, 11, and in a position to form a roller support for the work. To suitably adjust the rollers 42 for various kinds of work the base plate 7 is formed with a transverse slot 43 to receive clamping means 44 which clamp the brackets 45 in which the rollers are mounted.

Having now set forth the objects and nature of my invention and a construction embodying the principles thereof what I claim as new and useful and of my own invention and desire to secure by Letters Patent is:—

1. In a duplex electric welding machine, a stationary and an oppositely disposed movable frame, a transformer carried by each frame, a plurality of welding points carried by each frame, the points carried by one frame being arranged to form members of cooperating pairs of points with those carried by the other frames, said contact points being arranged in series with each other in a circuit which includes the secondaries of both transformers, one of the welding points carried by one of said frames being yieldingly mounted with reference to the other point carried by said frame.

2. In a duplex electric welding machine, a stationary and an oppositely disposed movable frame, a transformer carried by each frame, a plurality of welding points carried by each frame, the points carried by one frame being arranged to form members of cooperating pairs of points with those carried by the other frames, said contact points being arranged in series with each other in a circuit which includes the secondaries of both transformers, and means for moving said movable frame towards and from the stationary frame, one member only of one of the cooperating pairs of points being yieldingly mounted.

3. In a duplex electric welding machine, oppositely disposed frames, a transformer carried by each frame, a plurality of welding points also carried by each frame, the welding points on one frame forming members cooperating with points carried by the other frame to form pairs of contacts between which the work is to be positioned, all of said points being arranged in series in the secondary windings of both transformers, the primaries of said transformers being coupled up in parallel in the exciting circuit.

4. In a duplex electric welding machine, oppositely disposed transformers, a plurality of welding points associated with each transformer, the points associated with one transformer cooperating with points associated with the other transformer to form cooperating pairs of points, all of said points being disposed in series in a secondary circuit common to both transformers, the primaries of said transformers being coupled up in parallel in the exciting circuit.

5. In a duplex electric welding machine, oppositely disposed transformers, a plurality of welding points associated with each transformer, the points associated with one transformer cooperating with points associated with the other transformer to form cooperating pairs of points, all of said points being disposed in series in a secondary circuit common to both transformers, and means to yieldingly support one member only of one pair of said points.

6. In a duplex electric welding machine, oppositely disposed transformers, a plurality of welding points associated with each transformer, the points associated with one transformer cooperating with points associated with the other transformer to form cooperating pairs of points, all of said points being disposed in series in a secondary circuit common to both transformers, a movable support for one of said points, and means for yieldingly resisting the movement of said support.

7. In a duplex electric welding machine, oppositely disposed transformers, a plurality of welding points associated with each transformer, the points associated with one transformer cooperating with points associated with the other transformer to form cooperating pairs of points, all of said points being disposed in series in a secondary circuit common to both transformers, said points including a body and a projecting portion having communicating channels formed therein, and water supply and delivery pipe connections to and from said channels.

8. In a duplex electric welding machine, a fixed frame and a movable frame, said frames respectively carrying cooperating members of pairs of welding points, and a roller work support disposed between said frames.

9. In a duplex electric welding machine, a fixed frame and a movable frame, said frames respectively carrying cooperating members of pairs of welding points, and a roller work support disposed between said frames, and means for adjusting said roller work supports to accommodate various sizes of work.

10. In a duplex electric welding machine, a fixed frame and a movable frame, said frames respectively carrying cooperating members of pairs of welding points, a rack connected to said movable frame, gearing for operating said rack, and means for controlling said gearing to shift said movable frame towards and from the fixed frame.

11. In a duplex electric welding machine, a base plate having a transverse slot, roller work supports mounted for transverse adjustment in said slots, sets of welding points disposed on opposite sides of said support, the points of one set cooperating with the points of the other set to form pairs, a transformer associated with each set, all of said points when in working position operating to close a circuit constituting the secondary circuit of both transformers.

In testimony whereof I have hereunto set my hand on this 14th day of April A. D., 1919.

JOSEPH LEDWINKA.